United States Patent
Oh et al.

(10) Patent No.: US 10,391,880 B2
(45) Date of Patent: Aug. 27, 2019

(54) BATTERY PACK AND ELECTRIC VEHICLE INCLUDING THE SAME

(71) Applicant: SAMSUNG SDI CO., LTD., Yongin-si, Gyeonggi-do (KR)

(72) Inventors: Seotaek Oh, Yongin-si (KR); Youngdong Seo, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 112 days.

(21) Appl. No.: 15/359,641

(22) Filed: Nov. 23, 2016

(65) Prior Publication Data

US 2017/0144564 A1  May 25, 2017

(30) Foreign Application Priority Data

Nov. 25, 2015  (KR) .................. 10-2015-0165566

(51) Int. Cl.
  *B60L 11/18* (2006.01)
  *H02J 7/00* (2006.01)
  *B60L 58/12* (2019.01)
  *B60L 58/21* (2019.01)

(52) U.S. Cl.
  CPC .......... *B60L 11/1864* (2013.01); *B60L 58/12* (2019.02); *B60L 58/21* (2019.02); *H02J 7/007* (2013.01); *H02J 7/0021* (2013.01); *H02J 7/0026* (2013.01); *H02J 7/0063* (2013.01); *B60L 2240/545* (2013.01); *B60L 2240/547* (2013.01); *B60L 2240/549* (2013.01); *H02J 2007/004* (2013.01); *Y02T 10/7005* (2013.01); *Y02T 10/7044* (2013.01); *Y02T 10/7061* (2013.01); *Y02T 10/7258* (2013.01)

(58) Field of Classification Search
  CPC .............. B60L 11/1851; B60L 11/1861; B60L 11/1864; H02J 7/0021; H02J 7/0026; H02J 7/0063; H02J 7/007; H02J 2007/004; Y02T 10/7258
  USPC .............................................. 307/10.1, 10.7
  See application file for complete search history.

(56) References Cited

U.S. PATENT DOCUMENTS

| | | | |
|---|---|---|---|
| 5,910,722 A * | 6/1999 | Lyons .............. | B60K 6/46 320/104 |
| 6,157,165 A * | 12/2000 | Kinoshita .......... | H02J 7/0019 320/116 |
| 6,724,172 B2 | 4/2004 | Koo | |
| 8,127,874 B2 | 3/2012 | Suzui | |
| 2005/0003927 A1 * | 1/2005 | Asakawa ............ | B60K 6/485 477/3 |

(Continued)

FOREIGN PATENT DOCUMENTS

| | | |
|---|---|---|
| KR | 10-2004-0000724 A | 1/2004 |
| KR | 10-2004-0000991 A | 1/2004 |
| KR | 10-2008-0105157 A | 12/2008 |

*Primary Examiner* — Levi Gannon
(74) *Attorney, Agent, or Firm* — Lee & Morse, P.C.

(57) ABSTRACT

A battery pack and an electric vehicle including the battery pack, the battery pack including a battery, the battery including at least one battery cell that is rechargeable and dischargeable, wherein the battery supplies power to a load; a controller configured to control an amount of power to be used by the load; and a battery manager configured to measure a remaining capacity of the battery and to provide information about the measured remaining capacity to the controller.

12 Claims, 2 Drawing Sheets

(56) References Cited

U.S. PATENT DOCUMENTS

| | | | | |
|---|---|---|---|---|
| 2010/0253357 A1* | 10/2010 | Seo | ............... | G01R 19/16542 324/427 |
| 2011/0001352 A1* | 1/2011 | Tamura | ............... | B60R 16/033 307/9.1 |
| 2012/0112700 A1* | 5/2012 | Morimoto | ............ | H01M 10/48 320/132 |
| 2013/0106173 A1* | 5/2013 | Nomura | ............. | H01M 10/443 307/9.1 |
| 2013/0261865 A1* | 10/2013 | Toki | ..................... | B60K 6/48 701/22 |
| 2014/0309824 A1* | 10/2014 | Bito | .................... | B60W 10/08 701/22 |
| 2014/0327400 A1* | 11/2014 | Kudo | .................. | H02J 7/0016 320/118 |
| 2015/0210232 A1* | 7/2015 | Kanzaki | ............. | B60R 16/033 701/36 |
| 2016/0185340 A1* | 6/2016 | Yoshida | .............. | B60W 20/13 701/22 |

* cited by examiner

BATTERY PACK AND ELECTRIC VEHICLE INCLUDING THE SAME

CROSS-REFERENCE TO RELATED APPLICATION

Korean Patent Application No. 10-2015-0165566, filed on Nov. 25, 2015, in the Korean Intellectual Property Office, and entitled: "Battery Pack and Electric Vehicle Including the Same," is incorporated by reference herein in its entirety.

BACKGROUND

1. Field

Embodiments relate to a battery pack and an electric vehicle including the same.

2. Description of the Related Art

An electric vehicle operated according to motor control may use a predetermined discharging current, received from a battery pack.

SUMMARY

Embodiments are directed to a battery pack and an electric vehicle including the same.

The embodiments may be realized by providing a battery pack including a battery, the battery including at least one battery cell that is rechargeable and dischargeable, wherein the battery supplies power to a load; a controller configured to control an amount of power to be used by the load; and a battery manager configured to measure a remaining capacity of the battery and to provide information about the measured remaining capacity to the controller.

The battery manager may control charging and discharging of the battery, and may set a protection voltage level of the battery according to a discharge current of the battery.

The battery manager may reduce the protection voltage level of the battery in response to a reduction in the discharge current of the battery.

The controller may control the amount of power to be used by the load according to the remaining capacity.

The battery manager may stop discharging of the battery when a voltage of the battery is lower than a minimum protection voltage level.

The embodiments may be realized by providing an electric vehicle including a driving motor; a battery that is rechargeable and dischargeable, the battery being configured to supply power to the driving motor; a motor controller configured to control an amount of power to be used by the driving motor; and a battery manager configured to measure a remaining capacity of the battery and to provide information about the measured remaining capacity to the motor controller.

The battery manager may control charging and discharging of the battery, and may set a protection voltage level of the battery according to a discharge current of the battery.

The battery manager may reduce the protection voltage level of the battery in response to a reduction in a discharge current of the battery.

The motor controller may control the amount of power to be used by the driving motor according to the remaining capacity.

The battery manager may stop discharging of the battery when a voltage of the battery is lower than a minimum protection voltage level.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
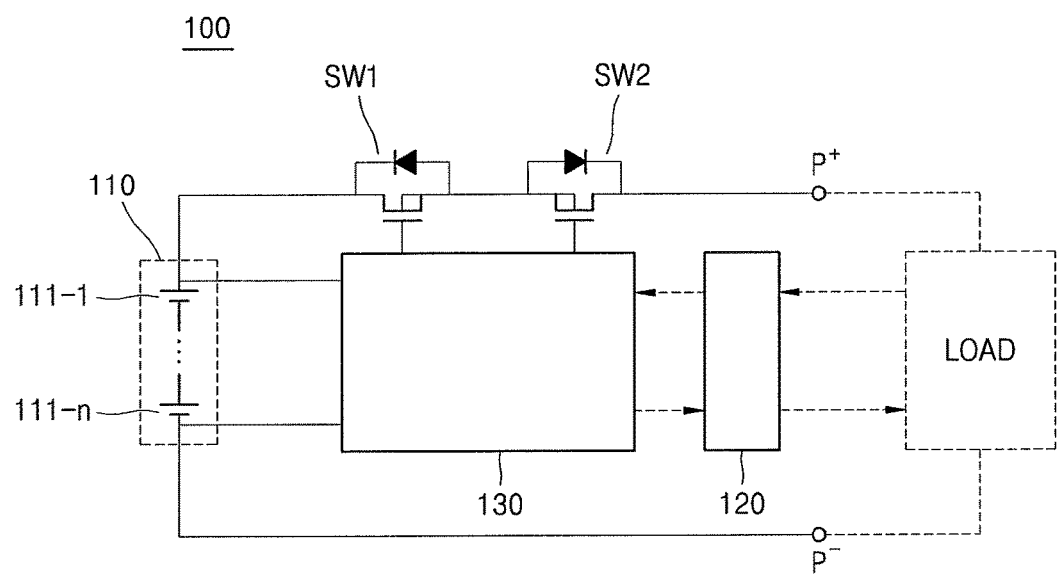
FIG. 1 illustrates a schematic view of a structure of a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

The terms used in the present specification are merely used to describe particular embodiments, and are not intended to limit the application. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The above terms are used only to distinguish one component from another.

FIG. 1 illustrates a schematic view of a structure of a battery pack 100 according to an exemplary embodiment.

Referring to FIG. 1, the battery pack 100 may include a battery 110, a controller 120, and a battery manager 130. The battery 110 may include at least one battery cell, e.g., a plurality of battery cells 111-1 through 111-$n$, which are rechargeable and dischargeable. The battery 110 supplies power to a load LOAD.

The battery pack 100 and the load LOAD may be connected to each other via battery pack terminals P+ and P−, and power may be supplied to the load LOAD through the battery pack terminals P+ and P−. In an implementation, when the battery pack 100 is connected to a charging device through the battery pack terminals P+ and P−, power is supplied from the charging device to the battery 110 so as to charge each of the battery cells 111-1 through 111-$n$ included in the battery 110.

For example, a discharging current output from the battery 110 may flow through the battery pack terminals P+ and P−, and also, a charging current input by the charging device may flow through the battery pack terminals P+ and P−.

The battery cells 111-1 through 111-$n$ may include a rechargeable secondary battery. In an implementation, the battery cells 111-1 through 111-$n$ may include, e.g., a nickel-cadmium battery, a lead storage battery, a nickel metal-hydride (NiMH) battery, a lithium-ion battery, or a lithium polymer battery.

The controller 120 may control an amount of power to be used by the load LOAD (e.g., the amount of power supplied to the load LOAD). The battery manager 130 may measure a remaining charging capacity of the battery 110 and may provide information about the measured remaining charging capacity of the battery 110 to the controller 120. The controller 120 may control the amount of power to be used by or supplied to the load LOAD according to or in response to the remaining charging capacity.

For example, if the remaining charging capacity of the battery 110 is reduced and not much available usage period or time thereof is left, the controller 120 may control the load LOAD such that less power is used by or supplied to the load LOAD.

The battery manager 130 may control charging and discharging of the battery 110. The battery manager 130 may control charging and discharging operations of the battery 110 by controlling a discharging switch SW1 and a charging switch SW2. When the battery manager 130 turns off the discharging switch SW1, a discharging current output from the battery 110 to the outside of the battery pack 100 may be blocked. When the battery manager 130 turns off the charging switch SW2, a charging current input to the battery pack 100 is blocked.

In an implementation, the battery manager 130 may monitor data such as voltages, temperatures, a charging current, a discharging current, or the like of the battery cells 111-1 through 111-$n$, and may control charging and discharging of the battery 110 based on the monitored data.

The battery manager 130 may calculate a remaining power amount, lifetime, a state of charge (SOC) of the battery based on the monitored data, or may determine whether any abnormality has occurred in the battery 110. For example, the battery manager 130 may determine whether abnormalities such as over-charging, over-discharging, over-current, over-voltage, over-heating, battery cell imbalance, deterioration of battery cells or the like have occurred.

When an abnormality has occurred in the battery 110, the battery manager 130 may perform an operation that is set according to an internal algorithm therein. For example, the battery manager 130 may control the charging switch SW2 and/or the discharging switch SW1, or may cut off a fuse.

In an implementation, the battery manager 130 may control a balancing operation of the battery cells 111-1 through 111-$n$ according to the monitored data and a preset algorithm.

The battery manager 130 may control the amount or level of a protection voltage of the battery 110 according to the amount of a discharging current of the battery 110. For example, when the amount of the discharging current output from the battery 110 is reduced, the battery manager 130 may also set the protection voltage to a lower voltage.

The amount of the protection voltage may indicate an under voltage protection (UVP) level, and may be understood as a voltage level that is set to protect the battery 110 from over-discharging when a voltage of the battery 110 is decreased to a predetermined voltage or lower.

When the controller 120 has set a small amount of power to be used by or supplied to the load LOAD according to the remaining charging capacity of the battery 110, the amount of the discharging current output from the battery 110 may be less than before a controlling operation of the controller 120. When the amount of the discharging current is reduced, according to this reduced amount of the discharging current, the battery manager 130 may set the protection voltage to be lower than before the controlling operation of the controller 120.

When a voltage of the battery 110 is lower than a lowest or minimum protection voltage, the battery manager 130 may block discharging of the battery 110. When the battery pack 100 has battery capacity left, the battery pack 100 according to an embodiment may adjust the amount of a discharging current and a UVP level to thereby increase a usage period or time of the battery 110 thereof. However, when a battery voltage is decreased to a predetermined voltage or lower, this decrease in the battery voltage may affect the battery 110 and a system including the battery 110 as a whole. Accordingly, when a battery voltage is equal to or higher than the lowest protection voltage, the battery manager 130 may adjust the UVP level according to the above-described operation. When the battery voltage is reduced to be lower than the lowest protection voltage, the battery manager 130 may no longer adjust the UVP level but stop discharging of the battery 110.

Figure 2:
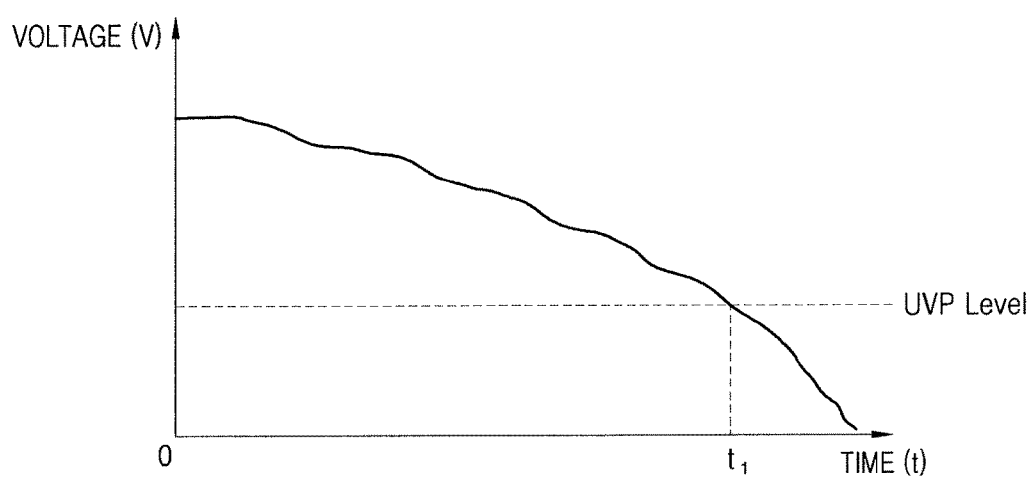
FIG. 2 illustrates a graph of a variation in a battery voltage according to time.

FIG. 2 illustrates a graph showing a variation in a battery voltage according to time.

In the graph of FIG. 2, a horizontal axis denotes time, and a vertical axis denotes a battery voltage. Also, the graph of FIG. 2 corresponds to an example where a battery is not charged during use of the battery. Also, the graph of FIG. 2 shows an exemplary variation in a battery voltage, and the exemplary embodiments are not limited to the form of the variation in the battery voltage shown in the graph of FIG. 2.

As the usage period of the battery increases, the battery voltage is reduced, and at a time t1 when the battery voltage reaches an UVP level, discharging of the battery may be stopped to prevent over-discharging.

Even when the battery voltage reaches the UVP level, a battery charging capacity may actually be left or remain. A user using the battery may wish to continue use the battery without stopping battery discharge.

In this case, power supplied to the load LOAD may be reduced, and the UVP level may be changed, e.g., reduced, to continue discharging the battery. For example, when the battery voltage approaches the UVP level, the amount of a discharging current output from the battery may be reduced to 50% of a current (e.g., previous or initial) discharging current, and the UVP level may be changed to about 80% of a current (e.g., previous or initial) UVP level.

Thus, in the battery pack 100 (see FIG. 1) according to the exemplary embodiments, the amount of power to be used by or supplied to the load LOAD may be changed by considering a battery charging capacity. A battery protection voltage level may be set according to the changed amount of power to thereby increase a usage period of the battery 110.

Figure 3:
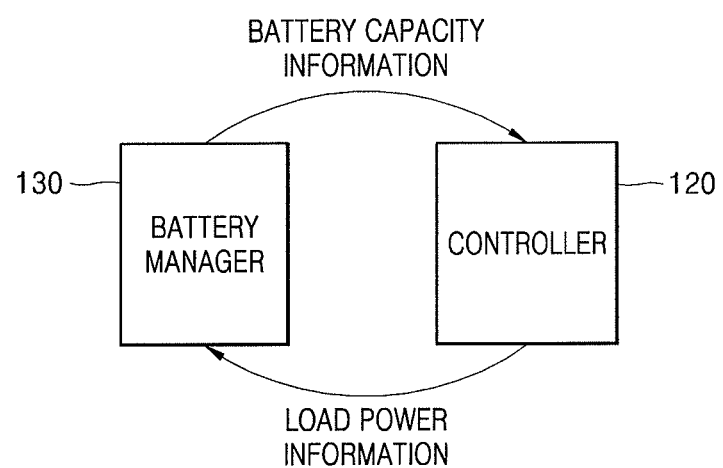
FIG. 3 illustrates a schematic view of an operation of a battery pack, according to an exemplary embodiment.

FIG. 3 illustrates a schematic view of an operation of a battery pack, according to an exemplary embodiment.

A battery manager 130 and a controller 120 illustrated in FIG. 3 are respectively the same as the battery manager 130 and the controller 120 described with reference to FIG. 1, and other elements may be omitted for convenience of description.

Referring to FIG. 3, the controller 120 may receive battery capacity information from the battery manager 130, and the battery manager 130 may receive load power information from the controller 120.

The controller 120 may control the amount of power to be used by or provided to a load based on the battery capacity information received from the battery manager 130. For example, when a battery capacity is reduced, the controller 120 may control a discharging current that is output to the load to be reduced to a smaller current than a current (e.g., previous or initial) discharging current.

In an implementation, the battery manager 130 may receive, from the controller 120, load power information, e.g., information about the amount of a discharging current to a load determined by the controller 120, and may change a UVP level of a battery according to the received information about the amount of the discharging current. For example, when the controller 120 determines that a smaller discharging current than a current (e.g., previous or initial) discharging current may be or is to be used, the battery manager 130 may set a UVP level that is lower than a current (e.g., previous or initial) UVP level. As the battery pack according to according to an embodiment performs this adjusting operation, a user may sufficiently use a capacity of a battery, and have an increased battery usage period.

Figure 4:
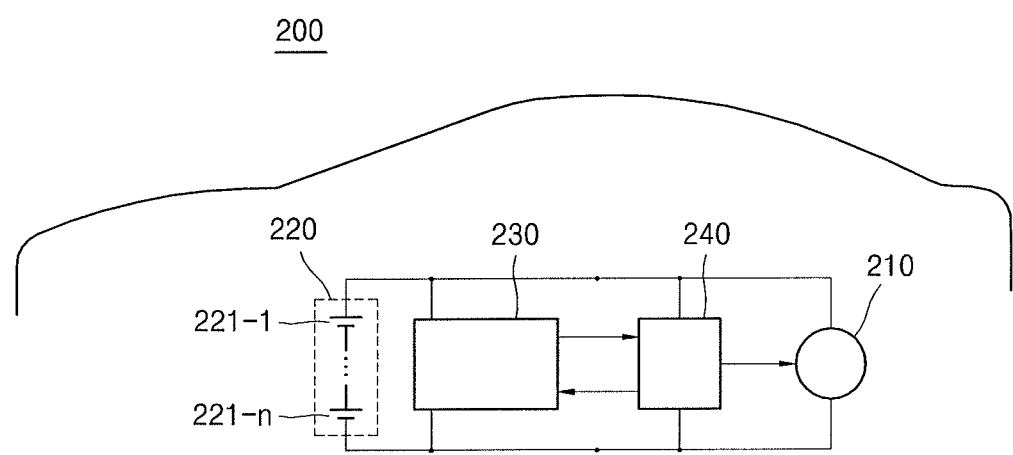
FIG. 4 illustrates a schematic view of a structure of an electric vehicle according to an exemplary embodiment.

FIG. 4 illustrates a schematic view of a structure of an electric vehicle 200 according to an exemplary embodiment.

Referring to FIG. 4, the electric vehicle 200 according to an exemplary embodiment may include a driving motor 210, a battery 220, a motor controller 240, and a battery manager 230. The driving motor 210 may provide motive power to the electric vehicle 200. The battery 220 is rechargeable or dischargeable, and may supply power to the driving motor 210. The battery 220 may include at least one battery cell, e.g., battery cells 221-1 through 221-n which are rechargeable and dischargeable.

The battery cells 221-1 through 221-n may include a rechargeable secondary battery. In an implementation, the battery cells 221-1 through 221-n may include, e.g., a nickel-cadmium battery, a lead storage battery, a NiMH battery, a lithium-ion battery, or a lithium polymer battery.

The motor controller 240 may control the amount of power to be used by or supplied to the driving motor 210. The battery manager 230 may measure a remaining charging capacity of the battery 220, and may provide information about the measured remaining charging capacity of the battery 220 to the motor controller 240.

The motor controller 240 may control the amount of power to be used by or supplied to the driving motor 210 according to the amount of the remaining charging capacity. For example, if the remaining charging capacity of the battery 220 is reduced and thus not much available usage period thereof is left, the motor controller 240 may control the driving motor 210 to use less power.

The battery manager 230 may control charging and discharging of the battery 220, and may set a protection voltage of the battery 220 according to a discharging current.

The battery manager 230 may control charging and discharging operations of the battery 220 by controlling discharging and charging switches. When the battery manager 230 turns off the discharging switch, a discharging current output from the battery 220 may be blocked. When the battery manager 230 turns off the charging switch, a charging current input to the battery 220 may be blocked.

Also, the battery manager 230 may monitor data such as voltages, temperatures, a charging current, a discharging current, or the like of the battery cells 221-1 through 221-n or the like, and may control charging and discharging of the battery 220 based on the monitored data.

The battery manager 230 may calculate a remaining power amount, lifetime, a state of charge (SOC) of the battery based on the monitored data, or may determine whether any abnormality has occurred in the battery 220. For example, the battery manager 230 may determine whether abnormalities such as over-charging, over-discharging, over-current, over-voltage, over-heating, battery cell imbalance, deterioration of battery cells, or the like have occurred.

When an abnormality has occurred in the battery 220, the battery manager 230 may perform an operation set according to an internal algorithm therein. For example, the battery manager 230 may control the charging switch and/or the discharging switch, or may cut off a fuse.

Also, the battery manager 230 may control a balancing operation of the battery cells 221-1 through 221-n according to the monitored data and a preset algorithm.

The battery manager 230 may control the amount of a protection voltage of the battery 220 according to the amount of a discharging current of the battery 220. For example, when the amount of the discharging current output from the battery 220 is reduced, the battery manager 230 may also set the protection voltage to a lower voltage.

The amount of the protection voltage may indicate an UVP level, and may be understood as a voltage level that is set to protect the battery 220 from over-discharging when a voltage of the battery 220 is decreased to a predetermined voltage or lower.

When the motor controller 240 has set a small amount of power to be used by or supplied to the driving motor 210 according to the remaining charging capacity of the battery 220, the amount of the discharging current output from the battery 220 may be less than before a controlling operation of the motor controller 240. When the amount of the discharging current is reduced, according to this reduced amount of the discharging current, the battery manager 230 may then set the protection voltage to be lower than before the controlling operation of the motor controller 240. For example, the protection voltage may be reduced without over-discharging the battery, due to the already reduced discharging current.

When a voltage of the battery 220 is lower than a lowest protection voltage, the battery manager 230 may block discharging of the battery 220. When there is remaining battery capacity, the electric vehicle 200 according to an embodiment may adjust the amount of a discharging current and a UVP level to thereby increase a usage period. However, when a battery voltage is decreased to a predetermined voltage or lower, this decrease in the battery voltage may affect the battery 220 and a system including the battery 220 as a whole. Accordingly, as long as a battery voltage is equal to or higher than the lowest protection voltage, the battery manager 230 may adjust the UVP level according to the above-described operation. When the battery voltage is reduced to be lower than or drops below the lowest protection voltage, the battery manager 230 may no longer adjust the UVP level but rather stops discharging of the battery 220.

In an implementation, as, illustrated in FIG. 4 the electric vehicle 200 may be an automobile. In an implementation, an electric bicycle or an electric motorcycle including an element that performs the above-described operation may also be understood as substantially having the same configuration as the electric vehicle 200 according to the exemplary embodiments.

By way of summation and review, when a user operates an electric vehicle, the electric vehicle may continuously use a predetermined current regardless of a capacity of a battery pack. Even when a charging capacity of a battery is not enough, if a predetermined discharging current is used, a protection operation of the battery pack may be quickly performed.

Thus, even though an actual battery capacity is still left, the user may not use the battery capacity to the full and a traveling distance of the electric vehicle may be reduced.

According to one or more exemplary embodiments, a battery pack, in which a protection voltage level of a battery is differently set according to a remaining charging capacity of the battery so as to increase a usage period of the battery, and an electric vehicle including the battery pack may be provided.

The embodiments may provide a battery pack in which a protection voltage level of a battery is differently set according to a remaining charging capacity of the battery so as to increase a usage period of the battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electric vehicle, comprising:
   a driving motor;
   a battery pack including:
      a battery that is rechargeable and dischargeable, the battery being configured to supply power to the driving motor;
      a discharging switch and a charging switch electrically connected in serial between the battery and the driving motor;
      a battery manager configured to directly control the discharging switch and the charging switch, to adjust an under voltage protection (UVP) level of the battery according to a discharging current of the battery, to measure a remaining capacity of the battery and to send remaining capacity information about the measured remaining capacity; and
      a motor controller configured to receive the remaining capacity information from the battery manager, and to control an amount of power to be used by the driving motor in response to the remaining capacity information,
   wherein:
      the motor controller is configured to reduce the amount of power to be used by the driving motor in response to the remaining capacity information, and to send reduced load power information about the reduced amount of power, and
      the battery manager is configured to reduce the UVP level of the battery in response to the reduced load power information.

2. The electric vehicle as claimed in claim 1, wherein the battery manager reduces the UVP level of the battery in response to a reduction in the discharging current of the battery.

3. The electric vehicle as claimed in claim 1, wherein the battery manager turns off the discharging switch when a voltage of the battery is lower than the UVP level.

4. The electric vehicle as claimed in claim 1, wherein:
   the motor controller is configured to send load power information about the controlled amount of power to be used by the driving motor to the battery manager, and
   the battery manager is configured to receive the load power information from the motor controller and to adjust the UVP level of the battery in response to the load power information.

5. The electric vehicle as claimed in claim 4, wherein the battery manager reduces the UVP level of the battery in response to data from the motor controller regarding a reduction in the discharge current of the battery.

6. The electric vehicle as claimed in claim 5, wherein the battery manager reduces the UVP level to 80% of an initial UVP level in response to the data from the motor controller regarding the reduction in the discharge current of the battery.

7. An electric vehicle, comprising:
   a driving motor;
   a battery that is rechargeable and dischargeable, the battery being configured to supply power to the driving motor;
   a discharging switch and a charging switch electrically connected in serial between the battery and the driving motor;
   a battery manager configured to directly control the discharging switch and the charging switch, to adjust an under voltage protection (UVP) level of the battery according to a discharging current of the battery, to measure a remaining capacity of the battery and to send remaining capacity information about the measured remaining capacity; and
   a motor controller configured to receive the remaining capacity information from the battery manager, and to control an amount of power to be used by the driving motor in response to the remaining capacity information,
   wherein:
   the motor controller is configured to reduce the amount of power to be used by the driving motor in response to the remaining capacity information, and to send reduced load power information about the reduced amount of power, and
   the battery manager is configured to reduce the UVP level of the battery in response to the reduced load power information.

8. The electric vehicle as claimed in claim 7, wherein the battery manager reduces the UVP level of the battery in response to a reduction in the discharging current of the battery.

9. The electric vehicle as claimed in claim 7, wherein the battery manager turns off the discharging switch when a voltage of the battery is lower than the UVP level.

10. The electric vehicle as claimed in claim 7, wherein:
    the motor controller is configured to send load power information about the controlled amount of power to be used by the driving motor to the battery manager, and the battery manager is configured to receive the load power information from the motor controller and to adjust the UVP level of the battery in response to the load power information.

11. The electric vehicle as claimed in claim 10, wherein the battery manager reduces the UVP level of the battery in response to data from the motor controller regarding a reduction in the discharge current of the battery.

12. The electric vehicle as claimed in claim 11, wherein the battery manager reduces the UVP level to 80% of an initial UVP level in response to the data from the motor controller regarding the reduction in the discharge current of the battery.

* * * * *